(12) United States Patent
Moore

(10) Patent No.: US 7,306,144 B2
(45) Date of Patent: Dec. 11, 2007

(54) CONTACTLESS CARD READER INTEGRATED INTO A TOUCHPAD

(75) Inventor: J. Douglas Moore, Salt Lake City, UT (US)

(73) Assignee: Cirque Corporation, Salt Lake City, UT (US)

( * ) Notice: Subject to any disclaimer, the term of this patent is extended or adjusted under 35 U.S.C. 154(b) by 0 days.

(21) Appl. No.: 11/229,033

(22) Filed: Sep. 16, 2005

(65) Prior Publication Data

US 2006/0097049 A1    May 11, 2006

(51) Int. Cl.
*G06K 5/00* (2006.01)
(52) U.S. Cl. ............................ 235/380; 235/375
(58) Field of Classification Search ............ 235/375, 235/380, 382, 487, 492, 451
See application file for complete search history.

(56) References Cited

U.S. PATENT DOCUMENTS

| | | | |
|---|---|---|---|
| 6,380,930 B1 | 4/2002 | Van Ruymbeke | |
| 6,486,862 B1* | 11/2002 | Jacobsen et al. | 345/88 |
| 6,867,981 B2* | 3/2005 | Murohara | 361/737 |
| 2005/0001711 A1* | 1/2005 | Doughty et al. | 340/5.74 |

* cited by examiner

*Primary Examiner*—Karl D. Frech
(74) *Attorney, Agent, or Firm*—Morriss O'Bryant Compagni

(57) ABSTRACT

A contactless smart card reader that is integrated into the hardware of a touchpad, wherein the circuit board substrate of the touchpad provides a mechanical substrate on which the hardware of the contactless smart card reader can be disposed, and wherein the touchpad is already widely distributed in other electronic appliances, and as a stand-alone device.

19 Claims, 4 Drawing Sheets

CONTACTLESS CARD READER INTEGRATED INTO A TOUCHPAD

BACKGROUND OF THE INVENTION

1. Field of the Invention

This invention relates generally to contactless smart cards and touchpads. More specifically, the present invention enables combining a contactless smart card reader and the hardware of a capacitance-sensitive touchpad to thereby offer the mechanical characteristics of the touchpad to the mechanical requirements of the contactless smart card reader.

2. Description of Related Art

The state of the art of smart cards has changed as the concept of smart cards has evolved. A typical smart card is a device having a housing that is often the same size as a credit card. The housing typically includes some sort of memory that enables the smart card to store information. Thus, the smart card is "smart" enough to hold its own data and applications. Some smart cards also include some rudimentary data processing capabilities through the addition of a processor. The result is that it is possible for the smart card to carry with it information in order to facilitate transactions.

Despite the obvious advantages that can be provided by smart cards they have never really caught on in the United States. In contrast, new applications and innovations in the technology are driven by the market in Europe where they are becoming ubiquitous. The smart cards now in use can store personal information, hold digital cash or prove identity. Smart cards are often contrasted with "dumb" cards that have magnetic strips or barcodes and rely more heavily on networks in order to function.

Despite the lack of penetration of smart cards into the US market, it appears that a modified smart card may become more popular in the United States. This evolved smart card is known as a "contactless card" or "contactless smart card". A contactless smart card is identical in size and appearance to a typical smart card, but it incorporates a new interface for communication with a card reader. This new smart card uses radio frequency transmission capabilities to communicate with compatible contactless smart card reader terminals.

The traditional smart card and dumb card must be inserted into or swiped through a card reader, the contactless smart card only has to be brought close enough to the contactless smart card reader for wireless radio communication between the card reader and the contactless smart card to take place.

For example, a contactless smart card is often used in walk-by or gate access applications for mass transit, or as a security identification card that can open a door or provide other access to a secure location. Contactless smart cards are even being used as verification of identity during some financial transactions that are performed electronically. For example, the contactless smart card is used to verify the identity of the party requesting the transaction.

The contactless smart card typically hides a microchip within a plastic housing and communicates through radio waves. Power for operation of a radio transceiver is provided to the contactless smart card through inductance coils and communication occurs via radio frequency signals and a capacitive plate antenna.

As contactless smart cards achieve greater penetration into the marketplace, the need is arising for contactless smart card terminals to be widely available for users. For example, in the case of using the contactless smart card to verify identity, it would be an advantage if a contactless smart card reader was available in devices that are also ubiquitous, such as in electronic devices that are commonly found at point-of-sale locations.

BRIEF SUMMARY OF THE INVENTION

It is an object of the present invention to provide a system that integrates a contactless smart card reader in an electronic appliance that is already widely available.

It is another object to provide the contactless smart card reader in an electronic appliance that can provide access to communication networks.

It is another object to integrate the contactless smart card reader with a component of an electronic appliance, where the component already functions as a communications interface.

In a preferred embodiment, the present invention is a contactless smart card reader that is integrated into the hardware of a touchpad, wherein the circuit board substrate of the touchpad provides a mechanical substrate on which the hardware of the contactless smart card reader can be disposed, and wherein the touchpad is already widely distributed in other electronic appliances, and as a stand-alone device.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
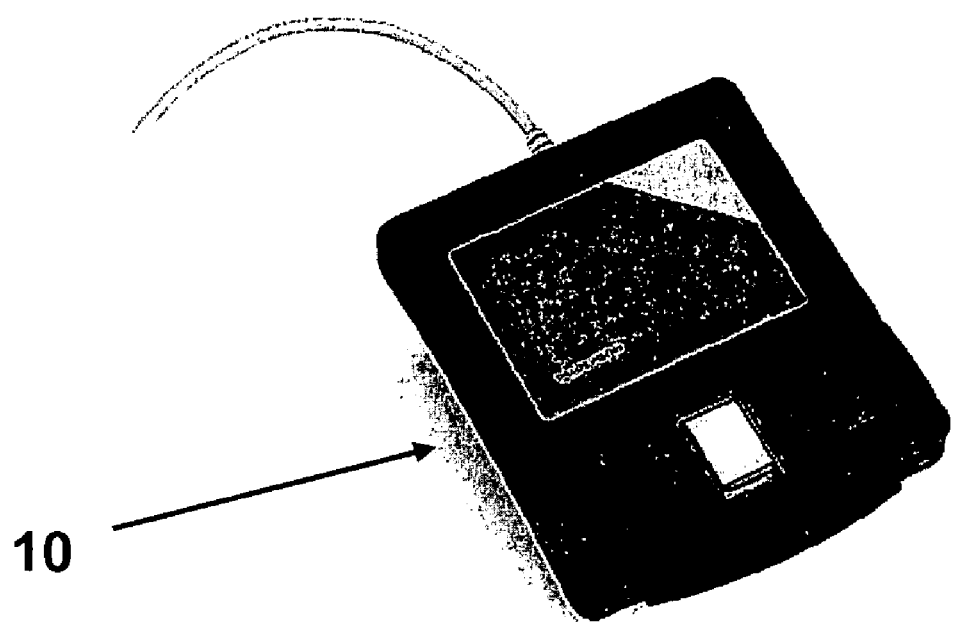
FIG. 1 is a perspective view of a touchpad housing that incorporates touchpad circuitry and a contactless smart card reader.

The presently preferred embodiment of the invention is a touchpad, such as a touchpad sold by CIRQUE® Corporation and shown in FIG. 1. The CIRQUE® GLIDEPOINT® touchpad is installed in many electronic appliances and as a stand-alone device. FIG. 1 is an illustration of a stand-alone touchpad 10. Such electronic appliances that incorporate a touchpad include many portable electronic appliances such as laptop computers, personal digital assistants (PDAs), mobile telephones, digital cameras, digital camcorders, etc.

The CIRQUE® GLIDEPOINT® technology is also integrated into devices that are not designed to be mobile, such as point-of-sale input devices. For example, when a user provides a credit card or a debit card to a cashier for a purchase, it is common to see a dumb card reader that enables the credit or debit card to be swiped in order to read a magnetic strip. The user then typically uses a pen that is coupled to the dumb card reader and either enters a signature or a debit card number. Thus, the CIRQUE® GLIDE-POINT® technology is capable of receiving diverse forms of user input.

Figure 2:
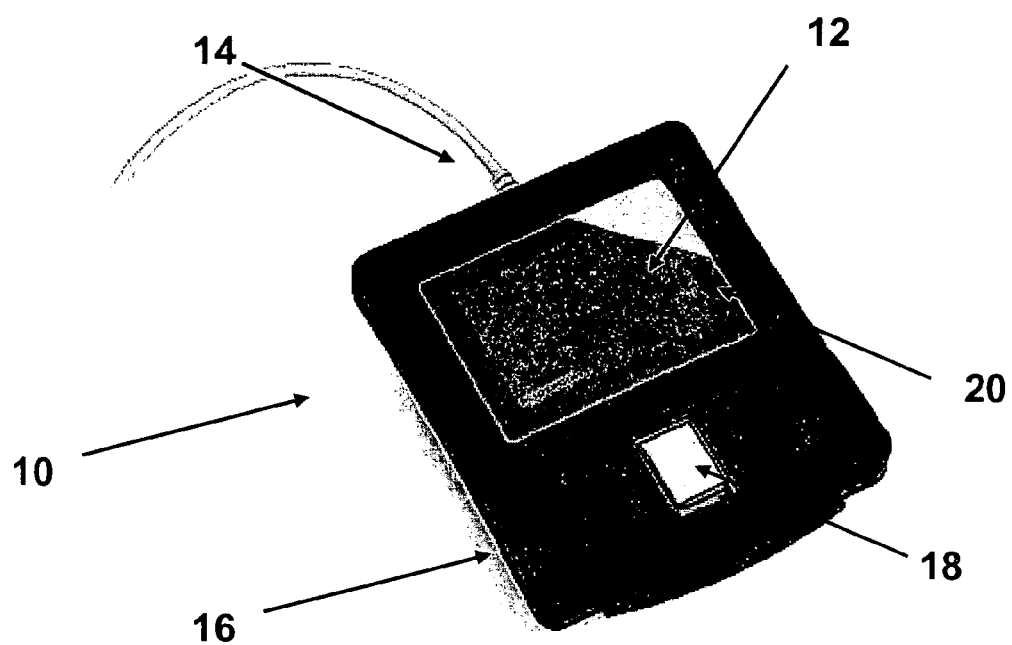
FIG. 2 is a close-up perspective view of the touchpad housing of FIG. 1.

FIG. 2 is a close-up perspective view of the touchpad 10 shown in FIG. 1. FIG. 2 shows that the touchpad 10 includes a touch-sensitive surface 12 that a user can touch or be in proximity with a pointing object such as a finger or other object that is detectable by the capacitance-sensitive circuitry of the touchpad. The touch-sensitive surface 12 should be considered to include proximity-sensing capabilities even when not specifically mentioned. The stand-alone touchpad 10 also includes a USB interface that includes a cable 14 that leads to a USB cable connector (not shown).

FIG. 2 also illustrates buttons 16 that are optionally associated with the touchpad 10. These buttons may be mechanical or capacitance-sensing in nature. Thus, the buttons may be off the touch-sensitive surface 12 as shown in FIG. 2, or disposed on the touch-sensitive surface as can be accomplished in other embodiments.

Another optional feature of a touchpad 10 is the inclusion of a fingerprint biometric sensor 18. The fingerprint biometric sensor 18 enables a user to use a fingerprint for applications that require proof of identity.

FIG. 2 also shows that a touchpad includes an embodiment of the present invention, although it is not visible on the touch-sensitive surface 12. The touchpad 10 includes an antenna shown as a dotted line 20. The antenna is disposed in this embodiment around an active touchpad area that is generally defined by the touch-sensitive surface 12. Thus, the antenna 20 my actually be just outside the dotted line shown because the conductive material for the antenna 20 may share the same substrate as the electrodes of the touchpad 10.

Figure 3:
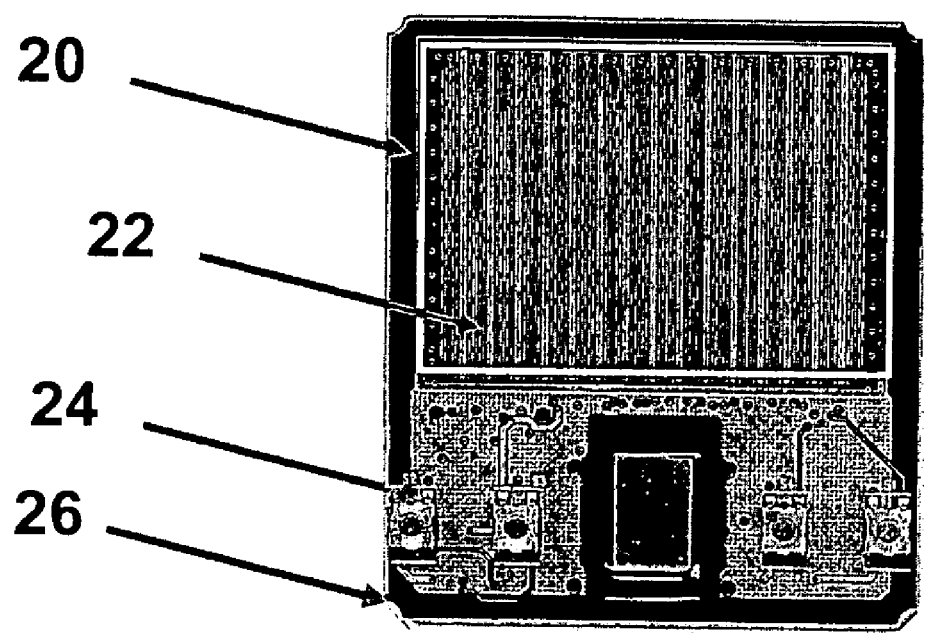
FIG. 3 is a top view of a touchpad circuit board with the contactless smart card reader antenna disposed thereon.

In FIG. 3, the circuitry 24 of the touchpad 10 that is disposed beneath the touch-sensitive surface 12 is shown for one particular embodiment. In this particular embodiment, a GLIDEPOINT® touchpad 10 contains a grid 22 of vertical and horizontal electrodes which are connected to a sophisticated full-custom mixed signal integrated circuit (ASIC) and other circuits 24 mounted on a substrate 26. "Mutual capacitance" from each of the horizontal electrodes to each of the vertical electrodes is continually measured by the circuitry 24. A person's finger on or near the touch-sensitive surface 12 alters the mutual capacitance between the vertical and horizontal electrodes. The position of the finger's center is precisely determined based upon changes in mutual capacitance as the finger moves across the touch-sensitive surface 12.

A contactless smart card reader requires an antenna 20 that broadcasts a signal to and receives a signal from a contactless smart card (not shown). The antenna 20 is shown disposed around the grid 22 of X and Y electrodes. Thus, it becomes apparent that the size and shape of the antenna 20 that the contactless smart card reader requires can be conveniently disposed on the substrate 26 of the touchpad 10. It is noted that the substrate 26 may be comprised of PC board material, or it may even be a flexible MYLAR®-type of substrate.

It is observed that while the antenna 20 is shown disposed in a very symmetric design around the perimeter of the electrode grid 22, the actual shape and composition of the antenna 20 can vary greatly from this embodiment. All that is required of the antenna 20 is that it provide a means of communication between a smart cart reader and a contactless smart card. Thus, any antenna design that will perform the desired function can be used.

The contactless smart card reader also requires a surface on which to mount its own electronic circuitry that enables the contactless smart card reader to perform its functions. The integrated circuits in the contactless smart card reader circuitry can also be mounted on the substrate 26 of the touchpad 10.

It is this marriage of convenient size of the touchpad, the shape of the touchpad, and the many devices that already use touchpads that make the integration of a contactless smart card reader into a touchpad so advantageous. The substrate 26 is provided on which to mount the necessary contactless smart card reader circuitry (not shown) and antenna 20. The contactless smart card reader circuitry is known to those skilled in the art, and can be assumed to be disposed either in the housing but separate from the substrate of the touchpad, or to be sharing the touchpad substrate. The contactless smart card reader circuitry includes all the circuitry necessary to send and receive radio frequency transmissions, to communicate with a contactless smart card, and to communicate with a communication network that will receive the information from the contactless smart card.

It should be understood that the touchpad substrate 26 may only include the grid 22. The touchpad circuitry 24 may be disposed on a separate substrate.

Figure 4:
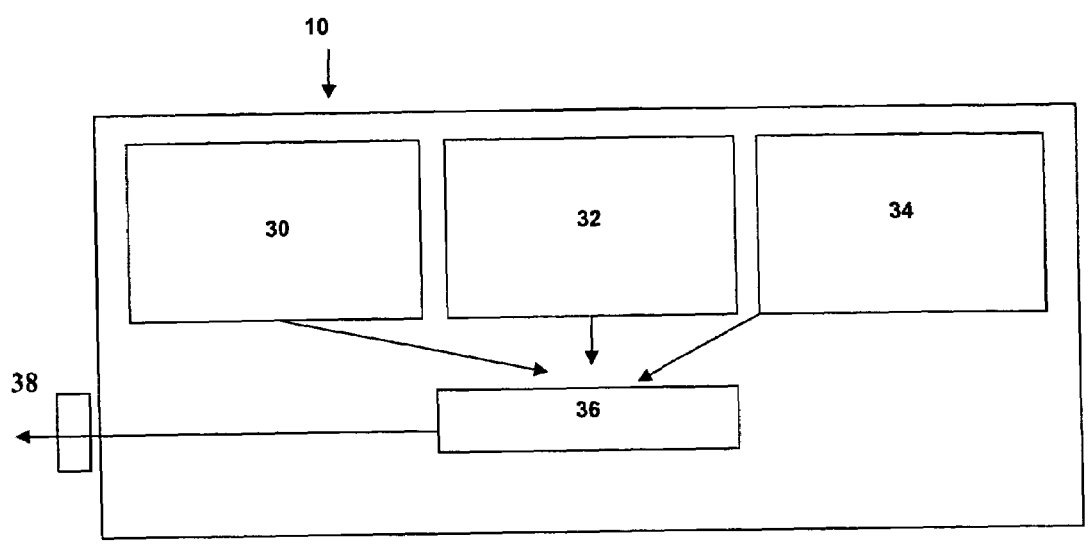
FIG. 4 is a block diagram of the functionality provided by the electronic circuitry within the touchpad housing.

FIG. 4 is provided as a block diagram that illustrates the several functions that can be performed in one embodiment of the present invention. In FIG. 4, the touchpad 10 is shown as provide the functions of a touchpad through a touch-sensitive surface 12, a touchpad grid 22, and touchpad circuitry 24. These items are shown collectively as touchpad functionality 30. For the sake of showing other functions that can be combined with a touchpad 10, fingerprint biometric sensor and circuitry is shown as 32. Finally, the contactless smart card reader antenna 20 and circuitry (not shown) are identified as item 34. These functions 30, 32, 34 may all communicate with a universal serial bus (USB) communications micro-controller 36 in the touchpad 10, which in turn is coupled to a USB connector 38.

The purpose of the USB connector 38 is such that the contactless smart card reader can be disposed in communication with a communication network. For example, if a financial transaction is taking place, the communication network enables the contactless smart card reader to communication with a financial network. Alternatively, the USB connector 38 may not be included in the touchpad. Instead, the touchpad and the contactless smart card reader may communicate by some other means to a network or other device. For example, the touchpad and/or the contactless smart card reader may include a wireless connection to a network, such as a computer network.

It should be understood that the fingerprint biometric functions 32 that are shown in the touchpad are for illustration purposes only. This function 32 is not present in another embodiment. This function 32 is included for illustration purposes only to demonstrate that none, one or more functions may be combined with the touchpad functions 30 and contactless smart card reader functions 34.

It should also be understood that the touchpad that can be used with the present invention is not limited to the capacitance-sensing technology used in the CIRQUE® GLIDE-POINT® touchpad. The touchpad can utilize other touchpad technology including pressure, optics, or any other touchpad technology that provides a surface for a user to move a pointing object.

In an alternative embodiment of the present invention, the antenna 20 is not disposed on the substrate of the touchpad 10, but is instead disposed on, under, or inside the housing of the touchpad. Thus, the housing can function as a substrate for the antenna 20 used by the contactless card reader. What is important is that the contactless card reader can be combined with a touchpad because touchpads are finding many uses today, especially at point-of-sale contact points. Thus, the term "combined" can take on various meanings.

One meaning is that some of the hardware is physically sharing a substrate. The term can also mean that the hardware is simply in close proximity to each other because of the advantages of providing both of these functions in relatively close proximity to each other.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system having a touchpad and integrated contactless card reader comprising:
   a touchpad including an electrode grid disposed on a touchpad substrate, and circuitry for detecting a pointing object that is touching or in close proximity to the electrode grid;
   a contactless card reader including an antenna and contactless card reader circuitry for performing wireless communication with a contactless smart card that is brought within range of the antenna of the contactless card reader; and
   wherein at least the antenna of the contactless smart card reader is disposed on the touchpad substrate with the electrode grid such that the antenna and the touchpad occupy a same area.

2. The system as defined in claim 1 wherein the antenna is disposed around a perimeter of the electrode grid on the touchpad substrate.

3. The system as defined in claim 2 wherein the contactless card reader circuitry is disposed on the touchpad substrate.

4. The system as defined in claim 3 wherein the system is further comprised of a touch-sensitive surface, wherein the touch-sensitive surface is disposed over the touchpad substrate.

5. The system as defined in claim 1 wherein the system is further comprised of another function that can operate without interfering with the touchpad or the contactless card reader.

6. The system as defined in claim 5 wherein another function is further comprised of a fingerprinting biometric sensor.

7. The system as defined in claim 5 wherein another function is further comprised of at least one button.

8. The system as defined in claim 1 wherein the contactless card reader is further comprised of a radio frequency transceiver.

9. A system having a touchpad and contactless card reader comprising:
   a housing for the touchpad and the contactless card reader;
   a touchpad including an electrode grid disposed on a touchpad substrate, and circuitry for detecting a pointing object that is touching or in close proximity to the electrode grid; and
   a contactless card reader including an antenna and contactless card reader circuitry for performing wireless communication with a contactless smart card, wherein the antenna is disposed in contact with the housing.

10. The system as defined in claim 9 wherein the contactless card reader is further comprised of a radio frequency transceiver.

11. A method for providing touchpad and contactless card reader functionality in an integrated device, said method comprising the steps of:
   1) providing a touchpad including an electrode grid disposed on a touchpad substrate, and circuitry for detecting a pointing object that is touching or in close proximity to the electrode grid;
   2) providing a contactless card reader including an antenna and contactless card reader circuitry for providing wireless communication with a contactless smart card; and
   3) disposing the antenna in a location that enables the contactless card reader and the touchpad to operate without interfering with each other;
   4) reading information from the contactless smart card by receiving information through the antenna of the contactless card reader.

12. The method as defined in claim 11 wherein the method further comprises the step of disposing the antenna around a perimeter of the electrode grid and on the touchpad substrate.

13. The method as defined in claim 12 wherein the method further comprises the step of providing circuitry for an additional function to be performed with the touchpad and the contactless card reader.

14. The method as defined in claim 13 wherein the method further comprises the step of providing fingerprinting biometric sensor circuitry as the additional function.

15. The method as defined in claim 13 wherein the method further comprises the step of providing at least one button as the additional function.

16. The method as defined in claim 11 wherein the method further comprises the step of providing a radio frequency transceiver as part of the contactless card reader circuitry.

17. The method as defined in claim 11 wherein the method further comprises the step of providing a housing for the touchpad and the contactless card reader.

18. The method as defined in claim 16 wherein the method further comprises the step of disposing the antenna in contact with the housing.

19. The method as defined in claim 18 wherein the method further comprises the step of providing a radio frequency transceiver as part of the contactless card reader circuitry.

* * * * *